(12) United States Patent
Tezuka et al.

(10) Patent No.: US 6,714,889 B2
(45) Date of Patent: Mar. 30, 2004

(54) PRODUCTION INSTRUCTION VOLUME DECISION SUPPORT METHOD AND PROGRAM THEREFOR

(75) Inventors: Masaru Tezuka, Sendai (JP); Masahiro Hiji, Sendai (JP)

(73) Assignee: Hitachi Tohoku Software, Ltd., Miyagi-ken (JP)

( * ) Notice: Subject to any disclaimer, the term of this patent is extended or adjusted under 35 U.S.C. 154(b) by 0 days.

(21) Appl. No.: 10/372,328

(22) Filed: Feb. 25, 2003

(65) Prior Publication Data

US 2003/0167146 A1 Sep. 4, 2003

(30) Foreign Application Priority Data

Feb. 28, 2002 (JP) ........................................ 2002-052738

(51) Int. Cl.[7] ............................. G06F 15/00; G01D 1/00
(52) U.S. Cl. ............................. 702/129; 705/1; 705/28; 703/6
(58) Field of Search ............................. 702/129; 703/6, 703/22; 705/1, 5, 7, 10, 26, 28, 37, 39, 80, 400; 700/214

(56) References Cited

U.S. PATENT DOCUMENTS 5,504,840 A * 4/1996 Hiji et al. ...................... 706/61
6,049,742 A * 4/2000 Milne et al. ................... 700/99
6,332,217 B1 * 12/2001 Hastings ....................... 717/178
6,560,234 B1 * 5/2003 Ben-Michael et al. ....... 370/401

FOREIGN PATENT DOCUMENTS

JP          9-073491         3/1997

* cited by examiner

*Primary Examiner*—John Barlow
*Assistant Examiner*—Hien Vo
(74) *Attorney, Agent, or Firm*—Mattingly, Stanger & Malur, P.C.

(57) ABSTRACT

A production instruction volume decision support method comprising the steps of: creating a plurality of sets of amount of the production order; obtaining a plurality of evaluation values based on simulation of demand for each product; obtaining a superiority relationship among the sets of amount of the production order from the evaluation values; creating a new set of amount of the production order from two sets of amount of the production order which are superior to the other sets of amount of the production order; repeating the above steps a predetermined number of times to obtain solutions to the plurality of sets of amount of the production order which have been optimized; displaying a plurality of sets of amount of the production order which have nothing superior thereto; and enabling a user to select one of them according to his/her management policy.

10 Claims, 14 Drawing Sheets

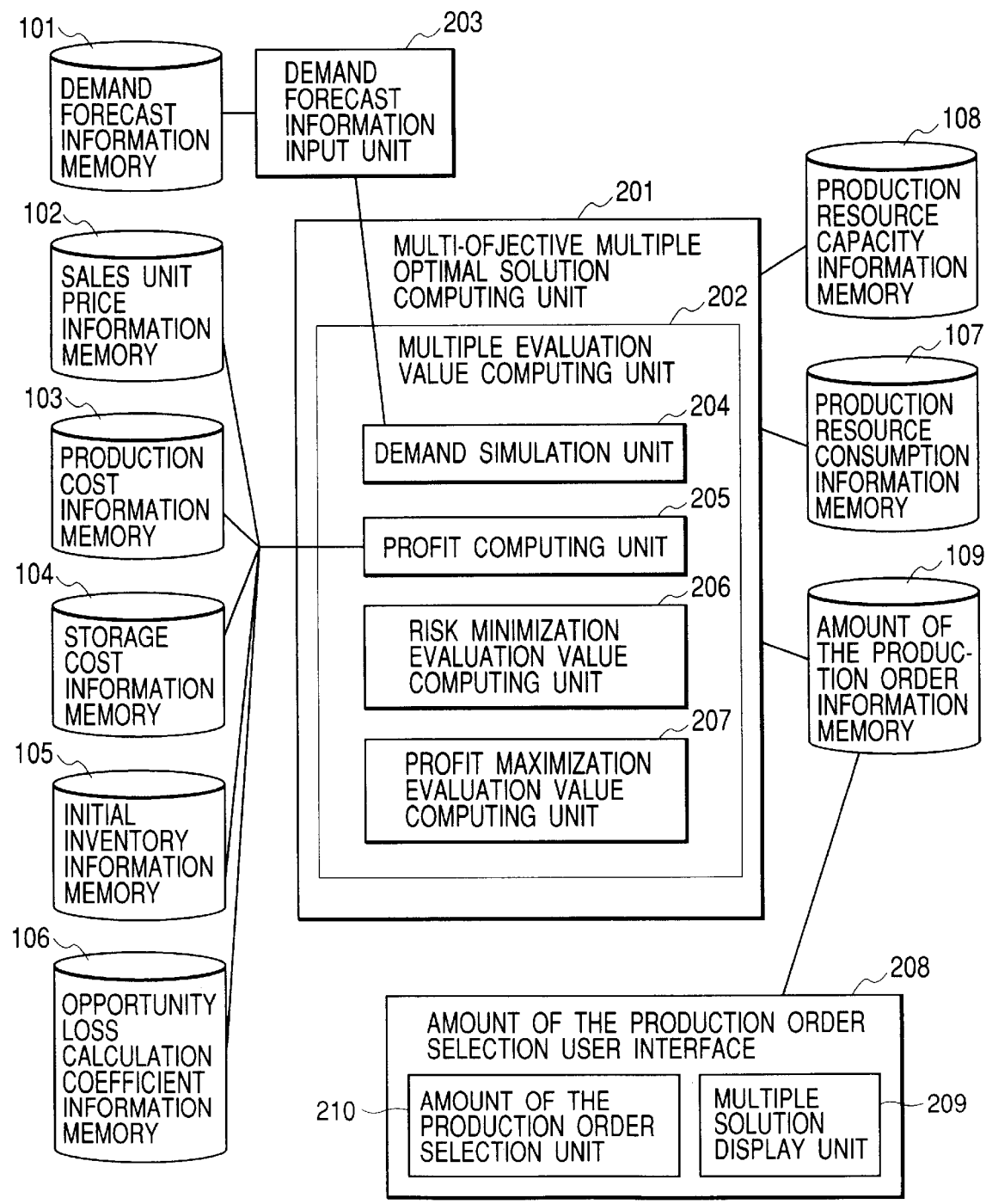

FIG. 2(a)

DEMAND FORECAST INFORMATION
(PROBABILITY DISTRIBUTION DIRECT SPECIFICATION TYPE)

PRODUCT A

| DEMAND | PROBABILITY |
|---|---|
| 900~1000 | 5% |
| 800~90 | 10% |
| ⋮ | ⋮ |

PRODUCT B

| DEMAND | PROBABILITY |
|---|---|
| 400~500 | 7% |
| 300~400 | 12% |
| ⋮ | ⋮ |

DEMAND FORECAST INFORMATION
(PROBABILITY DISTRIBUTION PARAMETER SPECIFICATION TYPE)

| PRODUCT NAME | DISTRIBUTION FORM | DISTRIBUTION PARAMETER |
|---|---|---|
| PRODUCT C | NORMAL DISTRIBUTION | AVERAGE = 500, DEVIATION = 20 |
| PRODUCT D | UNIFORM DISTRIBUTION | MAXIMUM = 800, MINIMUM = 700 |
| PRODUCT E | TRIANGULAR DISTRIBUTION | MAXIMUM = 800, MODE = 750, MINIMUM = 600 |
| ⋮ | ⋮ | ⋮ |

FIG. 3(a)
SALES UNIT PRICE INFORMATION

| PRODUCT NAME | SALES UNIT PRICE |
|---|---|
| PRODUCT A | ¥2,000 |
| PRODUCT B | ¥3,000 |
| ⋮ | ⋮ |

FIG. 3(b)
PRODUCTION COST INFORMATION

| PRODUCT NAME | PRODUCTION COST |
|---|---|
| PRODUCT A | ¥1,200 |
| PRODUCT B | ¥1,400 |
| ⋮ | ⋮ |

FIG. 3(c)
STORAGE COST INFORMATION

| PRODUCT NAME | STORAGE COST |
|---|---|
| PRODUCT A | ¥10 |
| PRODUCT B | ¥8 |
| ⋮ | ⋮ |

FIG. 3(d)
INITIAL INVENTORY INFORMATION

| PRODUCT NAME | INITIAL INVENTORY |
|---|---|
| PRODUCT A | 100 |
| PRODUCT B | 50 |
| ⋮ | ⋮ |

FIG. 3(e)
OPPORTUNITY LOSS CALCULATION COEFFICIENT INFORMATION

| PRODUCT NAME | SALES UNIT PRICE |
|---|---|
| PRODUCT A | ¥500 |
| PRODUCT B | ¥800 |
| ⋮ | ⋮ |

FIG. 3(f)
PRODUCTION RESOURCE CONSUMPTION INFORMATION

| PRODUCT NAME | CONSUMPTION |
|---|---|
| PRODUCT A | 10 |
| PRODUCT B | 20 |
| ⋮ | ⋮ |

FIG. 3(g)
PRODUCTION RESOURCE CAPACITY INFORMATION

| TOTAL CAPACITY |
|---|
| 15,000 |

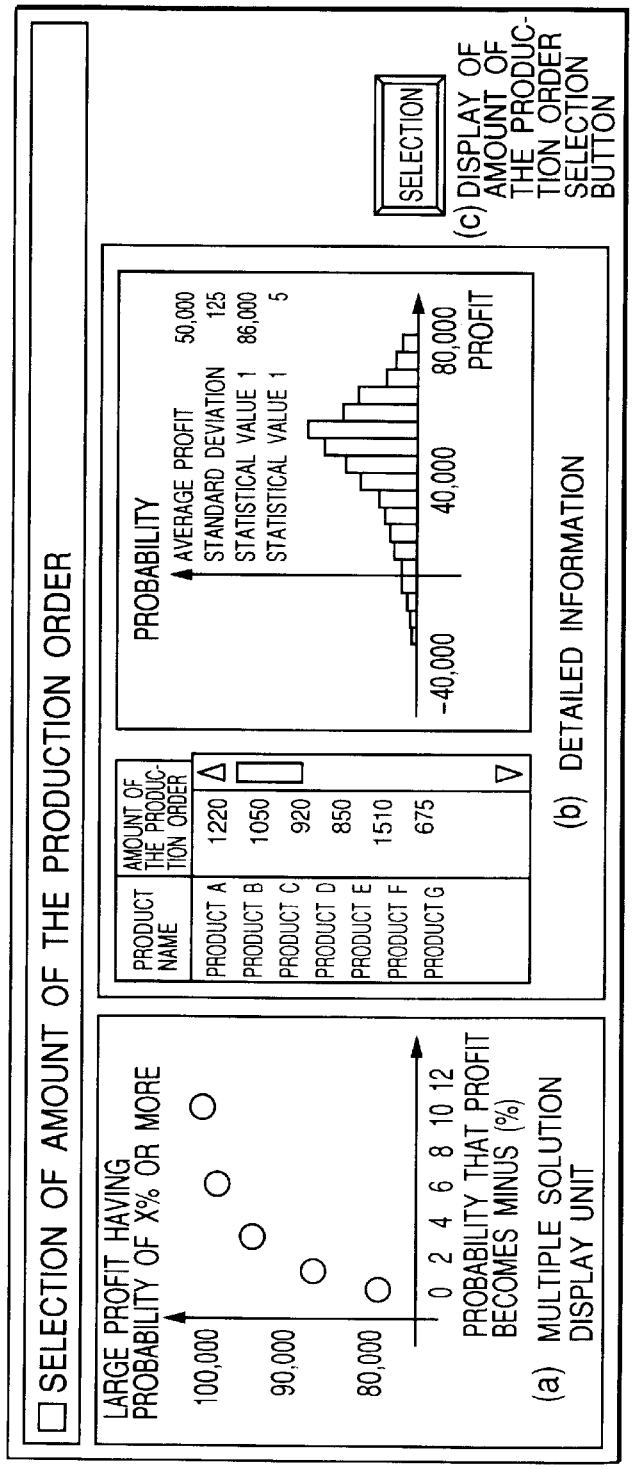

FIG. 7
STRUCTURE OF CHROMOSOME

| 00100101 | 00011000 | 01101100 | ... | 00111111 |
|---|---|---|---|---|
| 3,700 | 2,400 | 10,800 | ... | 6,300 |
| PRODUCTS 1 | PRODUCTS 2 | PRODUCTS 3 | | PRODUCTS N |

FIG. 8

☐ SELECTION OF AMOUNT OF THE PRODUCTION ORDER (a) MULTIPLE SOLUTION DISPLAY UNIT

LARGE PROFIT HAVING PROBABILITY OF X% OR MORE / PROBABILITY THAT PROFIT BECOMES MINUS (%)

(b) DETAILED INFORMATION

| PRODUCT NAME | AMOUNT OF THE PRODUCTION ORDER |
|---|---|
| PRODUCT A | 1220 |
| PRODUCT B | 1050 |
| PRODUCT C | 920 |
| PRODUCT D | 850 |
| PRODUCT E | 1510 |
| PRODUCT F | 675 |

PROBABILITY / PROFIT

AVERAGE PROFIT 50,000
STANDARD DEVIATION 125
STATISTICAL VALUE 1 86,000
STATISTICAL VALUE 1 5

(c) DISPLAY OF AMOUNT OF THE PRODUCTION ORDER SELECTION BUTTON — SELECTION

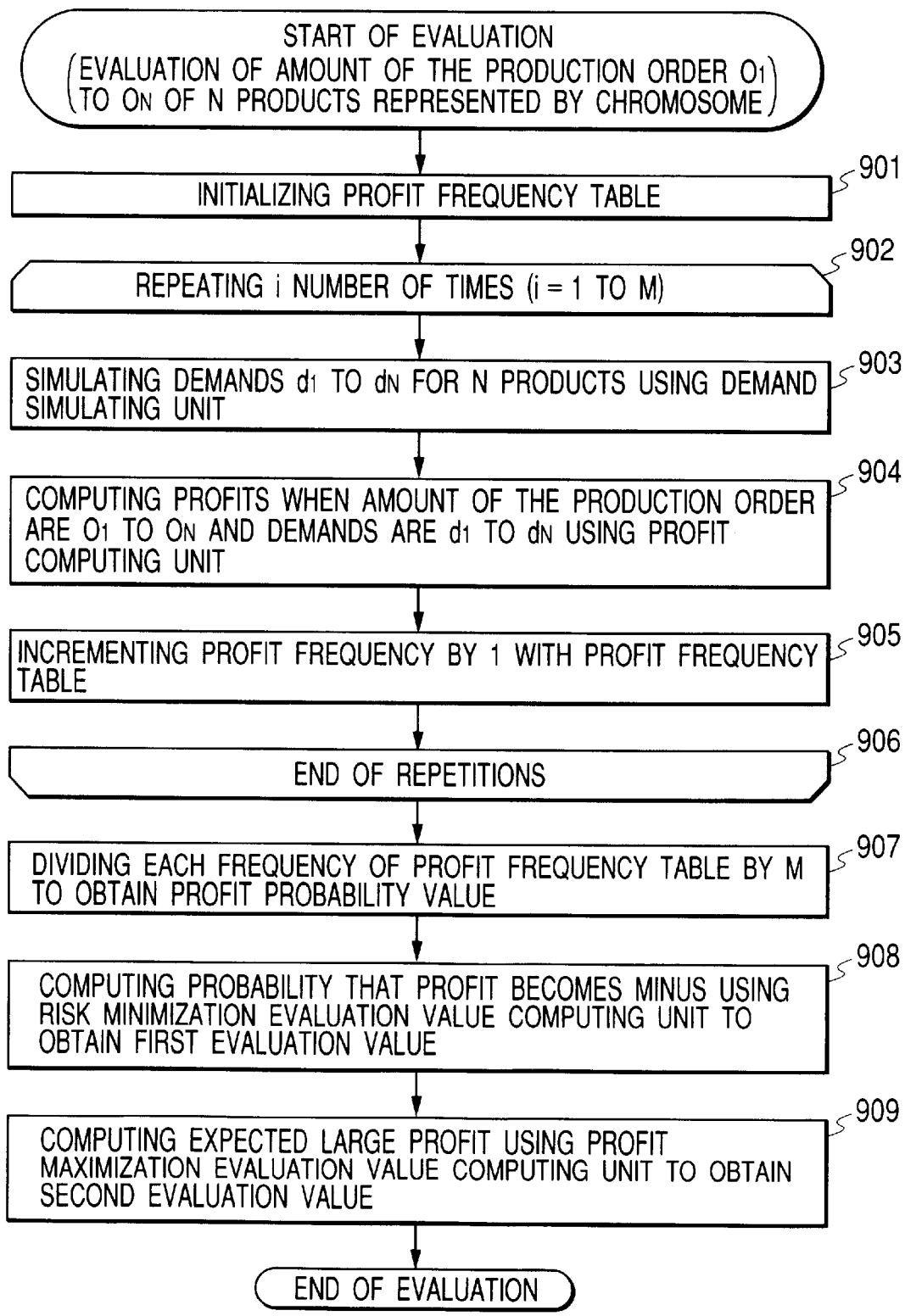

FIG. 10
PROFIT FREQUENCY TABLE

| PROFIT | FREQUENCY |
|---|---|
| 1,219,000~1,220,000 | TWICE |
| 1,218,000~1,219,000 | FIVE TIMES |
| ... | |
| 0~1,000 | THREE TIMES |
| TOTAL FREQUENCY | M TIMES |

FIG. 11

START OF DEMAND SIMULATION
(SIMULATION OF AMOUNT OF THE PRODUCTION ORDER $d_1$ TO $d_N$ OF N PRODUCTS)

1101: READING DEMAND FORECAST INFORMATION USING DEMAND FORECAST INFORMATION INPUT UNIT

1102: REPEATING i NUMBER OF TIMES (i = 1 TO N)

1103: CREATING RANDOM NUMBER ACCORDING TO PROBABILITY DISTRIBUTION OF DEMAND FORECAST INFORMATION OF PRODUCT i

1104: TAKING CREATED RANDOM NUMBER AS DEMAND $d_i$ FOR PRODUCT i

1105: END OF REPETITIONS

END OF SIMULATION

US 6,714,889 B2

PRODUCTION INSTRUCTION VOLUME DECISION SUPPORT METHOD AND PROGRAM THEREFOR

BACKGROUND OF THE INVENTION

1. Field of the Invention

The present invention relates to the decision support of the amount of the production order of a plurality of products using a computer and, particularly, to the decision support of amount of the production order based on demand forecasts for products.

2. Description of the Prior Art

A subject for the decision of amount of the production order for specifying the production volumes of a plurality of products in consideration of profit under restrictions, that is, limited production resources, is called "product mix problem" which is an important subject for the manufacturing industry. Heretofore, the method of determining amount of the production order by a Simplex method has been employed using only information on product cost and sales. However, as the probability distribution of demand forecast is not taken into consideration in this method, it is impossible to make quantitative evaluation on return and risk, for example, how much is the probability of obtaining a desired profit or how much is the probability of going into the red.

Japanese Laid-open Patent Application No. 9-73491 discloses a technology for computing expected values of inventory cost and sales profit from demand forecast to calculate one production instruction value from these values. However, as this technology outputs only one set of amount of the production order of a plurality of parts, the selection of amount of the production order based on the management strategy of a company is impossible.

In the manufacturing industry, production resources such as production equipment and materials are limited. It is necessary to determine the amount of the production order of a plurality of products in order to obtain the maximum profit from the limited production resources. The manufacturing industry which carries out production based on estimate must determine the volume of production by estimating demand for each product. It is desired that each production instruction volume should be determined based on the estimated profit and the probability of going into the red when production is carried out based on a certain production instruction volume.

Profit must be calculated from many factors such as production volume, demand, production cost, sales and inventory control cost. It is necessary to calculate the production instruction volume of each product so as to maximize the calculated profit and minimize the probability of going into the red. In general, there are many kinds of products and the number of variables used for the calculation of profit is large. Although demand for each product is represented by a random variable, as each of a large number of products has random variables, it is difficult to compute the probability distribution of profit having so many random variables.

It is also desired that a strategy based on the management policy of the manufacturing industry such as a high-risk high-return strategy that return is high though risk is high or a low-risk low-return strategy that return is obtained without fail and risk is low though return is low should be reflected on decisions on amount of the production order.

SUMMARY OF THE INVENTION

It is an object of the present invention to enable a user to select the final set of amount of the production order based on his/her management strategy by computing a plurality of sets of amount of the production order in consideration of demand forecast information and outputting profit and risk estimates for each of the sets of amount of the production order.

A plurality of sets of production volume instructions having information for specifying the production volumes of a plurality of products are created, demand for each product is simulated from demand forecast information for each product, evaluation values of a plurality of evaluation indices are computed from demand for each product and the production volume of each product for each set of amount of the production order, and sets of amount of the production order are computed which are inferior to other sets of amount of the production order in some evaluation indices but superior to the other sets of amount of the production order in the other evaluation indices to output a plurality of sets of amount of the production order and a plurality of sets of amount of the production order are displayed so that a user can select one of them.

BRIEF DESCRIPTION OF THE DRAWINGS

FIG. 1 is a whole structural diagram of an embodiment of a computer system to which the present invention is applied;

FIGS. 2A and 2B are diagrams of an example of demand forecast information in one embodiment of the present invention;

FIGS. 3A to 3G are diagrams of an example of information in one embodiment of the present invention;

FIG. 7 is a diagram of an example of the structure of a chromosome in one embodiment of the present invention;

FIG. 8 is a diagram of an example of display of a plurality of sets of amount of the production order in one embodiment of the present invention;

FIG. 9 is a flowchart of processing for the computation of multiple evaluation values in one embodiment of the present invention;

FIG. 10 is a diagram of an example of a profit frequency table used for the computation of multiple evaluation values in one embodiment of the present invention;

FIG. 11 is a flowchart of processing for the simulation of demand in one embodiment of the present invention;

DETAILED DESCRIPTION OF PREFERRED EMBODIMENTS

Figure 4:
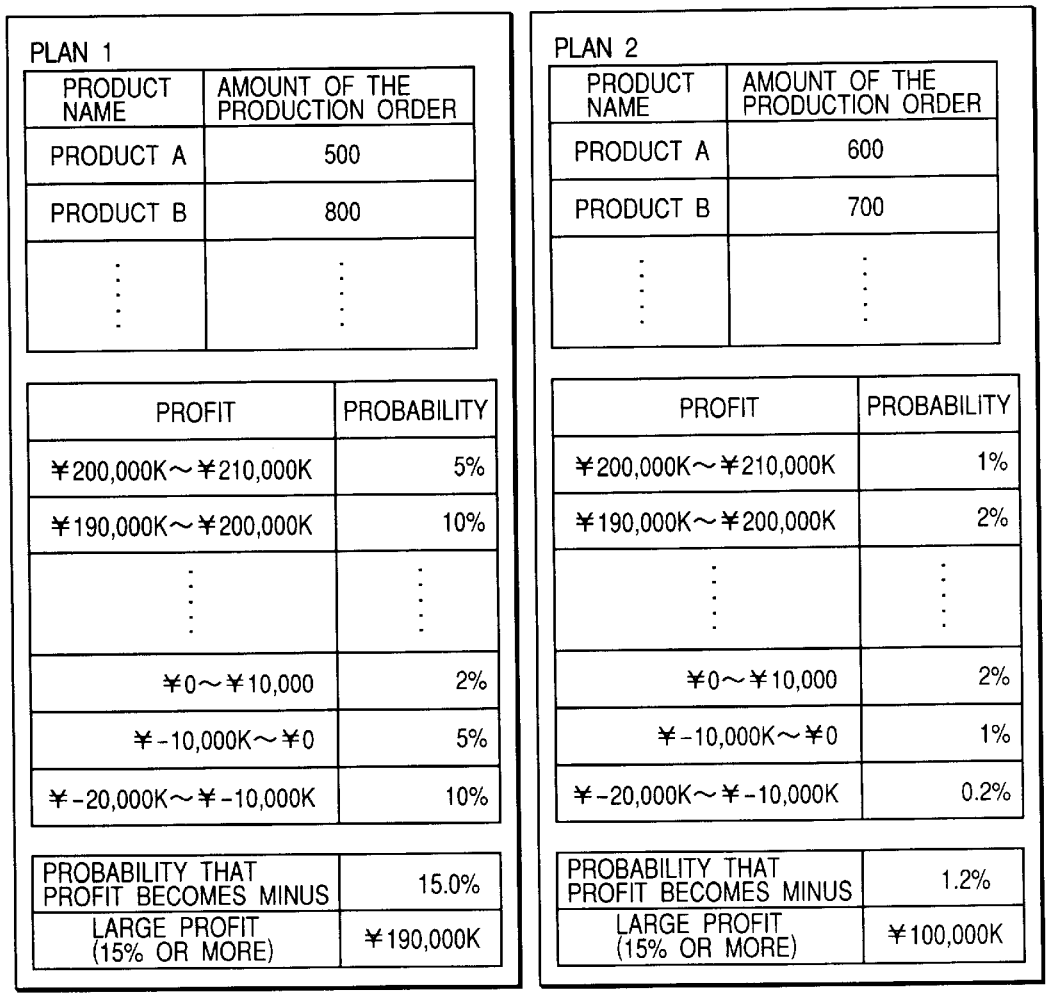
FIG. 4 is a diagram of production instruction volume information in one embodiment of the present invention.

A preferred embodiment of the present invention will be described hereinbelow with reference to the accompanying drawings. FIG. 1 is an entire structural diagram of a computer system to which the present invention is applied.

Reference numeral 101 denotes a demand forecast information memory, 102 a sales unit price information memory, 103 a production cost information memory, 104 a inventory cost information memory, 105 an initial inventory information memory, 106 an opportunity loss calculation coefficient information memory, 107 a production resource consumption information memory, 108 a production resource capacity information memory and 109 a production instruction volume information memory.

Denoted by 201 is a multi-objective multiple normal distribution computing unit which computes a plurality of sets of optimum amount of the production order using a multiple evaluation value computing unit 202 which comprises a demand simulating unit 204, a profit computing unit 205, a risk minimizing evaluation value computing unit 206 and a profit maximization evaluation value computing unit 207 and information from the above memories. A demand forecast information input unit 203 is an input unit for giving demand forecast information to the demand simulating unit 204. A production instruction volume selection user interface 208 displays solutions to a plurality of sets of amount of the production order created by the production instruction volume information memory 109 on a multiple solution display unit 209 and accepts selection by a production instruction volume selecting unit 210.

A plurality of sets of amount of the production order are created with the above constitution, a plurality of evaluation values are obtained based on the simulation of demand for each product, and the superiority relationship among the sets of amount of the production order is obtained with the evaluation values. Thereafter, a new set of amount of the production order is created from two sets of amount of the production order which are superior to the other sets of amount of the production order. The above procedure is repeated a predetermined number of times to obtain solutions to the plurality of sets of amount of the production order which have undergone the optimization processing. A plurality of sets of amount of the production order which have nothing superior thereto are displayed and a user is allowed to select one of the output plurality of sets of amount of the production order based on his/her management policy.

An embodiment of the present invention will be detailed hereinbelow. FIGS. 2A and 2B, FIGS. 3A to 3G and FIG. 4 show the formats of information stored in the memories 101 to 109. FIGS. 2A and 2B show examples of demand forecast information. There are some methods of displaying the probability of demand. FIG. 2A shows a probability distribution direct specification type in which probability and demand are given in pairs. FIG. 2B shows a probability distribution parameter specification type in which distribution forms such as normal distribution, uniform distribution and triangle distribution as well as distribution parameters are given.

FIG. 3A shows an example of sales unit price information. FIG. 3B shows an example of production cost information for each product. FIG. 3C shows an example of inventory cost information for each product. FIG. 3D shows an example of initial inventory information which indicates the number of each type of products in stock at the beginning of each period. FIG. 3E shows an example of opportunity loss calculation coefficient information which indicates a loss produced by losing a sales opportunity because demand exceeds the volume of production. This coefficient is set in consideration of various situations. For instance, when a customer comes to buy a company's own product which is out of stock, he/she buys another manufacturer's product and is expected to keep buying that product since then. This is considered as a great loss. FIG. 3F shows an example of production resource consumption information for the production of one product of each type. FIG. 3G shows production resource capacity information indicating a numerical value of total production capacity.

FIG. 4 shows the obtained production volume instruction information. This includes several solutions to amount of the production order and is read by the production instruction volume selection user interface 208.

A description is subsequently given of the processing of the system shown in FIG. 1. FIG. 7 shows data named "chromosome" used in a genetic algorithm handled in this embodiment. In the chromosome, 8 bits are allotted to each product and the amount of the production order of products 1 to N are expressed as a series of data. One chromosome represents one set of amount of the production order. Therefore, the length of one chromosome is 8N bits. Since the minimum unit of production instruction volume is 100 in this embodiment, a production instruction volume of 100 to 25,600 can be expressed for each product. The term "individual" as used hereinafter means data including one chromosome and its evaluation values.

Figure 6:
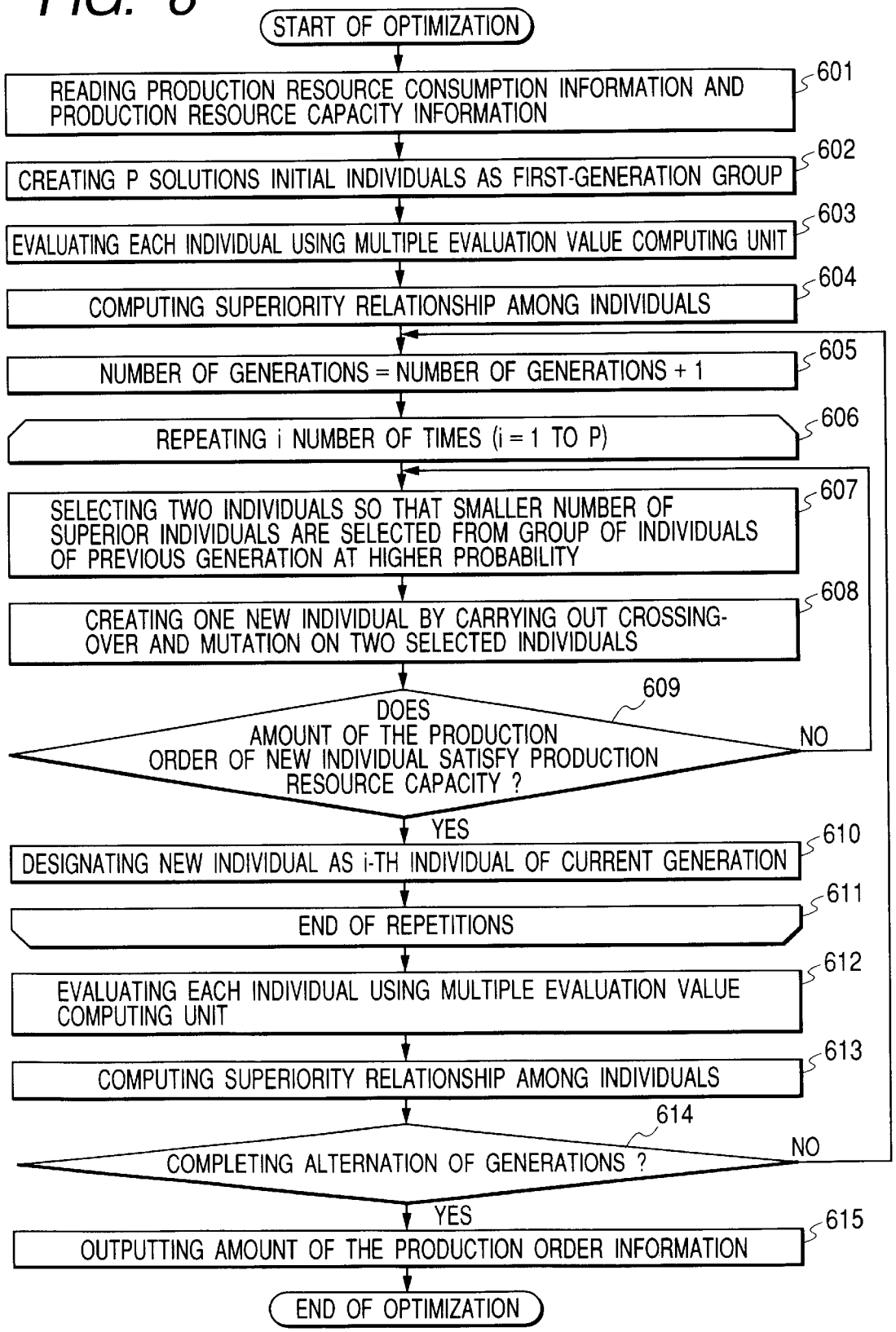
FIG. 6 is a flowchart of processing for obtaining a plurality of sets of amount of the production order in one embodiment of the present invention.

FIG. 6 is a flowchart of processing for obtaining a plurality of sets of optimal amount of the production order. Production resource consumption information and production resource capacity information are first read from the corresponding memories (601). Then, a P number of initial individuals (for example, 100 sets of amount of the production order) are created and considered as a first generation (602). The production instruction volume of each type of product of a chromosome contained in each individual is determined by a random number. Each chromosome satisfies the condition that the total of the amount of the production order falls below the total capacity of production resources. This chromosome is evaluated by the multiple evaluation value computing unit 202 which will be detailed hereinafter with reference to FIG. 9 (603). FIG. 9 will be described hereinafter. The superiority relationship among individuals is calculated (604). Each individual has a plurality of evaluation values of a plurality of evaluation indices. They include, for example, a risk minimum evaluation value, that is, the probability of obtaining a minus profit, and a profit maximization evaluation value, that is, (high) profitability obtained at a probability of a certain value or more. When the evaluation value of an evaluation index i of an individual a is represented by $a_i$ and the evaluation value of an evaluation index i of an individual b is represented by $b_i$, if $a_i \geq b_i$ and there is at least one evaluation index j which satisfies $a_j > b_j$, it is said that a is superior to b and b is inferior to a. Since an individual becomes better as it has a smaller risk minimization evaluation value, the above signs of inequality become opposite indirection. Since an individual becomes better as it has a larger profit maximization evolution value, the superiority relationship is determined by the above direction of the signs of inequality. This superiority relationship is calculated for all the individuals.

Thus, the processing for the first generation is over, and then the following processing is repeated while the number of generations is updated (605). The steps from 606 to 611 are repeated until the number of individuals becomes P. Two individuals are selected from the individuals of the previous generation so that a fewer individuals which are superior to other individuals are selected at a higher probability (607). Mutation or crossing-over of the chromosomes of the two selected individuals is caused to create one new individual (608). The term "mutation" as used herein means that the value (production instruction volume) of part (one or some of the products) of the chromosome is changed. Therefore, amount of the production order which cannot be found in the first created P number of sets of amount of the production order can be created. The term "crossing-over" means that first to M-th products of one chromosome and M+1-th to N-th products of another chromosome are combined. Thereby, one new chromosome can be produced from the two selected chromosomes.

The method of causing "mutation" is shown below. The product number k to which mutation is applied in the chromosome of one individual is determined by a random number. Production capacity is represented by C, resource consumption is represented by $a_i$ and the production instruction volume of a product i shown by the chromosome is represented by $o_i$.

Numerical Formula 1

$$U = \frac{C - \sum_{i=1, i \neq k}^{N} a_i o_i}{a_k}$$

An uniform random number is created from a range of 0 to U and taken as the production instruction volume $o_k$ of the product k.

The method of causing crossing-over is shown below.
Numerical Formula 2

Out of the two parents, the values of amount of the production order shown by the chromosome of one parent are represented by a vector $$\bar{o} = (o_1, o_2, \ldots, o_N)$$

and the values of amount of the production order shown by the chromosome of the other parent are represented by vectors $$\bar{p} = (p_1, p_2, \ldots, p_N).$$

One uniform random number is created from a range of 0 to 1.0 and expressed as α. When the values of amount of the production order shown by the chromosome of a new child individual created from the chromosomes of the above two parent individuals are $$\bar{q} = (q_1, q_2, \ldots, q_N),$$

$$\bar{q} = \alpha \bar{o} + (1-\alpha) \bar{p}$$

that is, $$q_i = \alpha o_i + (1-\alpha) p_i (i=1, \ldots, N)$$

are calculated for the processing of crossing-over.

It is determined whether the amount of the production order of the thus newly created individual satisfy the production resource capacity (609).

Numerical Formula 3

When the number of types of products is represented by N, the production instruction volume of product i is represented by $o_i$, and the consumption of production resources for the production of the product i is represented by $\alpha_i$, the total consumption of production resources is calculated from $$\sum_{i=1}^{N} a_i o_i.$$

When the thus calculated total consumption of production resources does not satisfy the production resource capacity, it is abandoned and the routine returns to step 607 to create a new individual. When it satisfies the production resource capacity, the new individual is taken as an i-th individual of the current generation (610). The steps from 606 to 611 are repeated until the number of newly created individuals becomes P.

Subsequently, each individual is evaluated in the same manner as in step 603 (612). The superiority relationship among the individuals is calculated in the same manner as in step 604 (613). It is determined whether the above processing is made on a predetermined number of generations (614). When computation for the predetermined number of generations is not completed, the routine returns to step 605 to repeat the same processing. When it is completed, information on a P number of chromosomes, that is, a P number of sets of amount of the production order are output (615) to complete optimization computation. These sets of amount of the production order are stored in the production instruction volume information memory 109.

The thus obtained plurality of sets of amount of the production order are processed and displayed. The user interface 208 for enabling a user to determine them and select one of them based on the judgment will be outlined with reference to FIG. 8. Its concrete structure will be detailed hereinafter with reference to FIGS. 16 to 18.

FIG. 8 shows an example of the displayed screen. (a) shows sets (chromosomes) of amount of the production order read from the production instruction volume information memory 109 by plotting the probability of obtaining a minus profit on the horizontal axis and large profit obtained at a probability of X % or more on the vertical axis. "X %" is a predetermined value. In the figure, each circle indicates one set (chromosome) of amount of the production order. Not all the sets of amount of the production order are displayed. Sets of amount of the production order to be plotted on the inner side of an array of the circles in the figure are inferior to the sets of amount of the production order shown by circles. For example, profit obtained at a probability of X % or more is smaller than a set of production instruction volume shown by a circle when the probability of obtaining a minus profit is the same. A set of amount of the production order which is inferior to the above set of amount of the production order is not displayed.

When one set of the amount of the production order thus plotted is specified with a mouse pointer or the like, its detailed information is displayed as shown in (b). The production instruction volume of each type of products is shown on the left side of (b). A graph showing the relationship between the profit and probability of the specified set of amount of the production order is given on the right side of (b). The user specifies any set of amount of the production order and chooses one production instruction volume based on his/her management decision with reference to its detailed information. More specifically, the user clicks a production instruction volume selection button shown in (c) while specifying one of a plurality sets of amount of the production order shown in (a) with a mouse pointer or the like. As described above, solutions to a plurality of amount of the production order are obtained so that the user can select and obtain a set of amount of the production order based on his/her management policy at that time such as high-risk high-return or low-risk low-return.

The multiple evaluation value computing unit 202 mentioned in FIG. 6 will be described in detail with reference to FIG. 9. This computation is carried out to obtain the superiority relationship among individuals in the subsequent step. The amount of the production order $O_1$ to $O_N$ of an N number of products represented by a chromosome are evaluated.

The profit frequency table 1001 shown in FIG. 10 is first initialized. The profit frequency table 1001 stores a plurality of profit values and the numbers of times when the calculated values become these profit values in pairs. Therefore, how many times of calculation is needed to obtain each profit value can be found.

As shown in steps 902 and 906, the steps from 903 to 905 are repeated an M number of times. Using the demand simulating unit 204, demands $d_1$ to $d_N$ for an N number of products are simulated (903). Then, using the profit computing unit 205, profits when demands in the case of the amount of the production order $O_1$ to $O_N$ of the N number of products are $d_1$ to $d_N$ are computed (904). Each of these profit values is represented by Profit. The profit of the profit frequency table 1001 increments the frequency in the Profit column by 1 (905).

As a result, the total of the frequency column of the profit frequency table 1001 becomes M. Each frequency of the profit frequency table 1001 is divided by M to obtain the probability value of profit (907). Based on this probability distribution of profit, the probability of obtaining a minus profit is computed by the risk minimization evaluation value computing unit 206 and taken as a first evaluation value (908). Further, expected large profit is computed by the profit maximization evaluation value computing unit 207 and taken as a second evaluation value (909). Thereby, the computation of multiple evaluation values is over.

The demand simulating unit 203 used in the step 903 for the above computation will be described with reference to FIG. 11. Demand forecast information is first read by the demand forecast information input unit 203 (1101). Then, steps 1103 and 1104 are repeated for each of the N number of products as shown in steps 1102 and 1105. A random number is created according to the probability distribution of the demand forecast information of product i (1103). Then the random number created in step 1103 is taken as demand $d_i$ for the product i (1104). Thereby, the simulation of demands for all the products is over.

Figure 15:
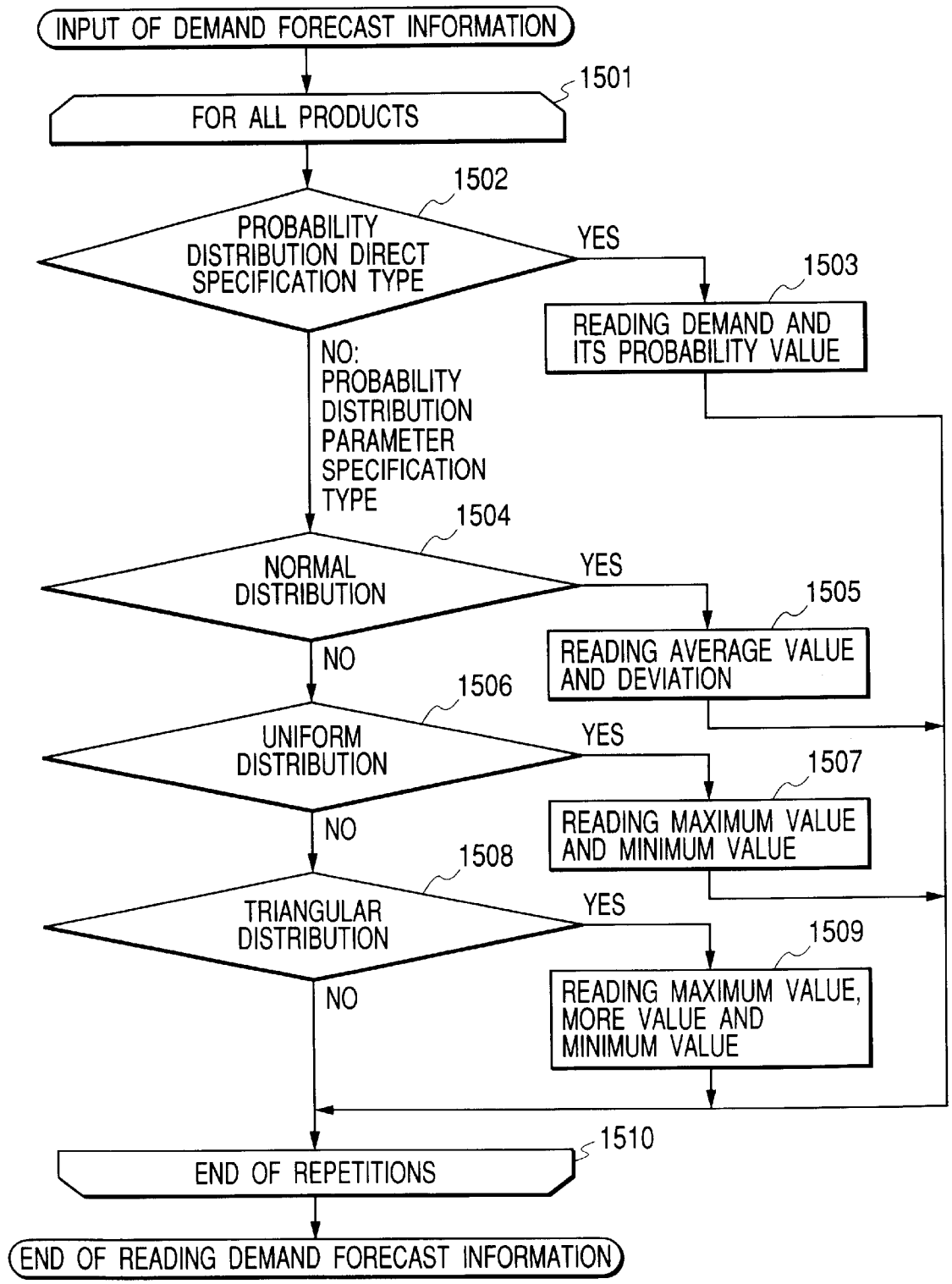
FIG. 15 is a flowchart of processing for the input of demand forecast information in one embodiment of the present invention.

The processing of the above demand forecast information input unit 203 will be described with reference to FIG. 15. The processing steps from 1501 to 1510 are carried out for each of all the products for the input of demand forecast information.

It is determined whether the read demand forecast information is of a probability distribution direct specification type (1502). When it is, demand and its probability value are read (1503). When it is not, it is determined whether the probability distribution is a normal distribution (1504). When it is a normal distribution, an average value and deviation are read (1505). When it is not, it is determined whether it is a uniform distribution (1506). When it is a uniform distribution, the maximum value and the minimum value are read (1507). When it is not a uniform distribution, it is determined whether it is a triangular distribution (1508). When it is a triangular distribution, the maximum value, the mode value and the minimum value are read (1509). In this example, a parameter specification type probability distribution is a normal distribution, uniform distribution or triangular distribution. Another distribution may be used.

Figure 12:
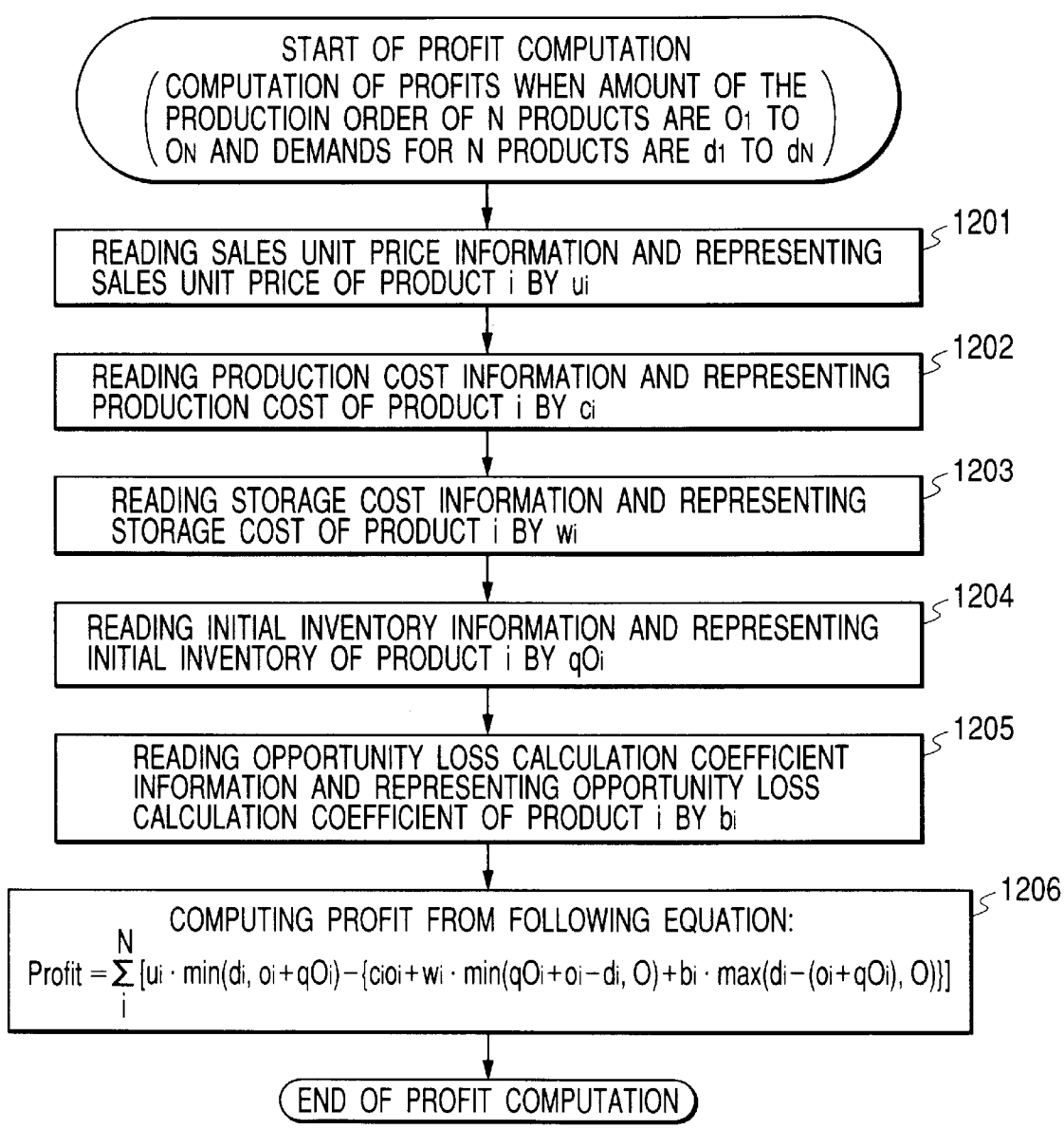
FIG. 12 is a flowchart of processing for the computation of profit in one embodiment of the present invention.

An example of the profit computing unit 205 mentioned in FIG. 9 will be described with reference to FIG. 12. Sales unit price information is read from the sales unit price information memory 102 and the sales unit price of the product i is represented by $u_i$ (1201). Production cost information is read from the production cost information memory 103 and the production cost of the product i is represented by $c_i$ (1202). Storage cost information is read from the inventory cost information memory 104 and the inventory cost of the product i is represented by $w_i$ (1203). Initial inventory information is read from the initial inventory information memory 105 and the initial inventory of the product i is represented by $qo_i$ (1204). Opportunity loss calculation coefficient information is read from the opportunity loss calculation coefficient memory 106 and the opportunity loss calculation coefficient of the product i is represented by $b_i$. Profit is obtained from the following equation (1206).

Numerical Formula 4

$$\text{Profit} = \sum_i^N [u_i \cdot \min(d_i, o_i + q0_i) -$$

$$\{c_i o_i + w_i \cdot \min(q0_i + o_i - d_i, 0) + b_i \cdot \max(d_i - (o_i + q0_i), 0)\}]$$

Thereby, the computation of profit is over. Other elements such as distribution cost may be included in the computation of profit.

Figure 5:
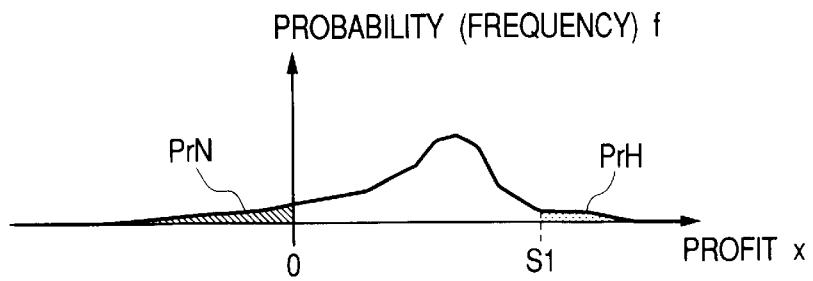
FIG. 5 is a diagram of the probability distribution of profit in one embodiment of the present invention.
Figure 13:
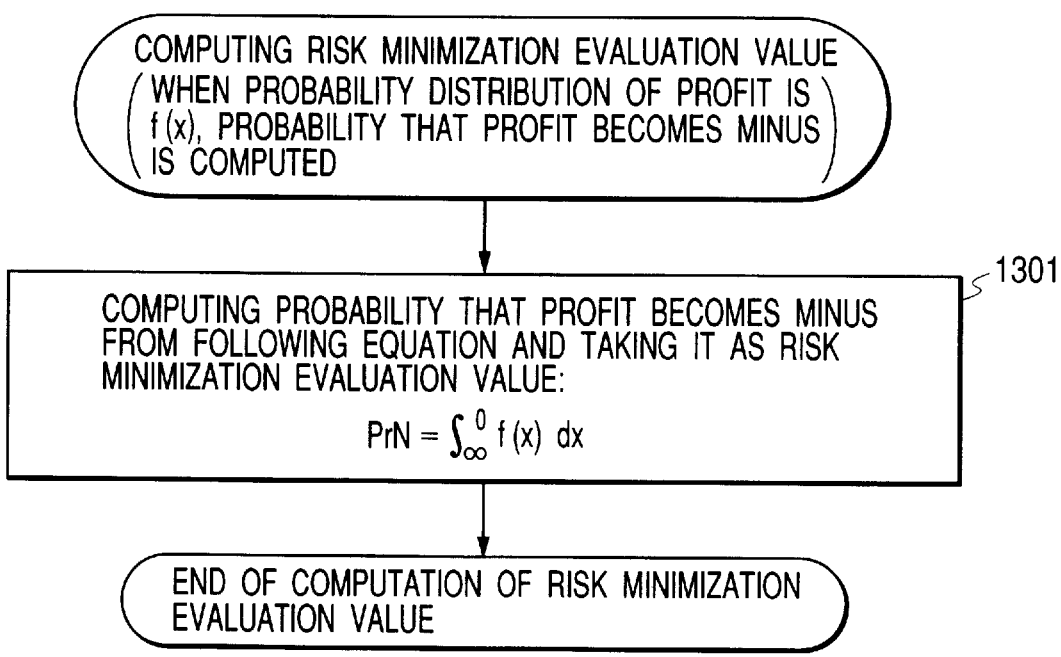
FIG. 13 is a flowchart of processing for the computation of a risk minimization evaluation value in one embodiment of the present invention.

An example of the risk minimization evaluation value computing unit 206 mentioned in FIG. 9 will be described with reference to FIG. 13. The risk minimization evaluation value computing unit 206 computes the probability of obtaining a minus profit calculated by the profit computing unit 205 of the multiple evaluation value computing unit 202 as an evaluation value. The probability of obtaining a minus profit is calculated from the equation shown in the figure and taken as a risk minimization evaluation value (1301). Suppose that the probability distribution created by the multiple evaluation value computing unit 202 is as shown in FIG. 5. PrN indicates the area of a portion shown by oblique lines where profit is 0 or less in FIG. 5.

Figure 14:
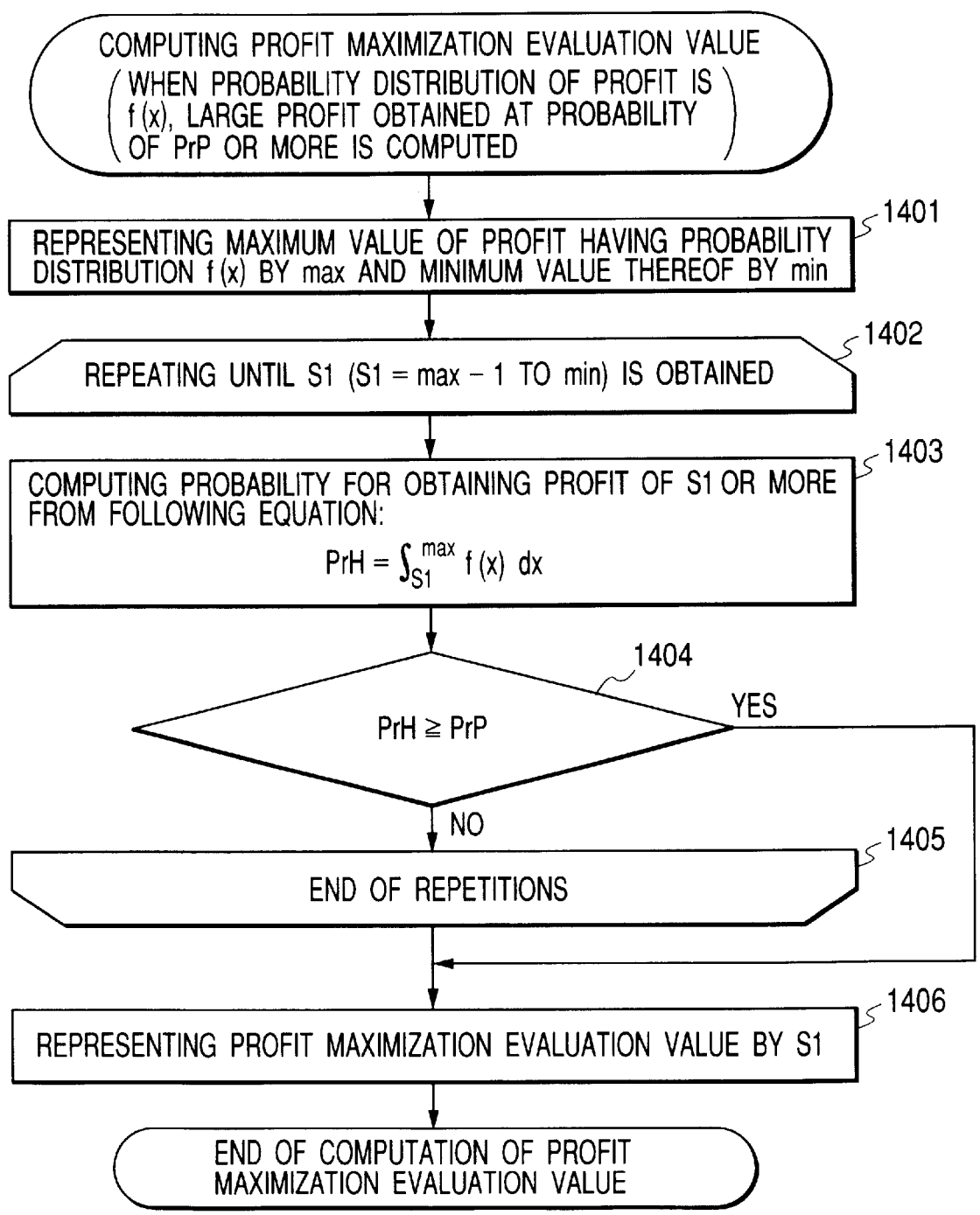
FIG. 14 is a flowchart of processing for the computation of a profit maximization evaluation value in one embodiment of the present invention.

An example of the profit maximization evaluation value computing unit 207 mentioned in FIG. 9 will be described with reference to FIG. 14. The profit maximization evaluation value computing unit 207 computes, as an evaluation value, a profit value obtained at a probability of a certain value or more using the probability distribution of profit created by the profit computing unit 205 of the multiple evaluation value computing unit 202. PrH in FIG. 5 signifies the probability of obtaining a profit of S1 or more. The profit maximization evaluation value computing unit 207 computes the minimum S1 so that PrH becomes a probability of a certain value or more. That is, when the probability is PrP, the minimum S1 which satisfies the following equation is computed.

Numerical Formula 5

$$PrH = \int_{S1}^{\infty} f(x)dx, \text{ where } PrH \geq PrP$$

To begin with, the maximum value of profit obtained from the probability distribution of profit is represented by max and the minimum value thereof is represented by min (1401). The steps from 1402 to 1405 are repeated by gradually reducing S1 from max−1 to min. In step 1403, the probability of obtaining a profit of S1 or more is computed by the given formula. Then it is determined whether PrH≧PrP (1404). When PrH≧PrP, S1 is taken as the maximization evaluation value of profit (1406). When not, the step 1403 is repeated as described above.

In this embodiment, the probability of obtaining a minus profit and a profit value obtained at a probability of a certain value or more are used as evaluation values. Another evaluation value may be used. For example, an expected value of profit (average value), a median of profit, a mode of profit, the ratio of inventory to safe inventory and the operation rate of production equipment may be used.

Figure 16:
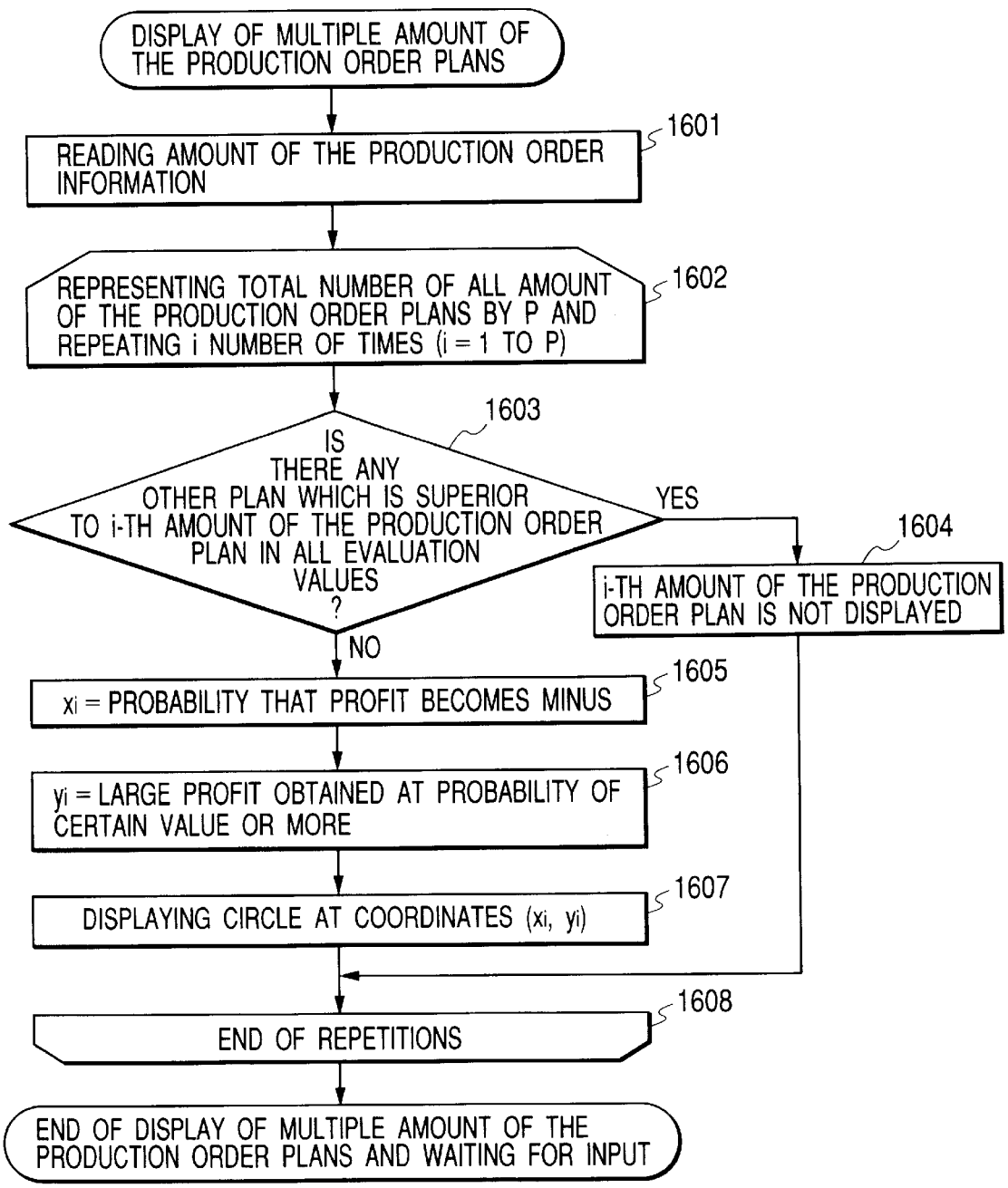
FIG. 16 is a flowchart of processing for the display of a plurality of sets of amount of the production order in one embodiment of the present invention.
Figure 17:
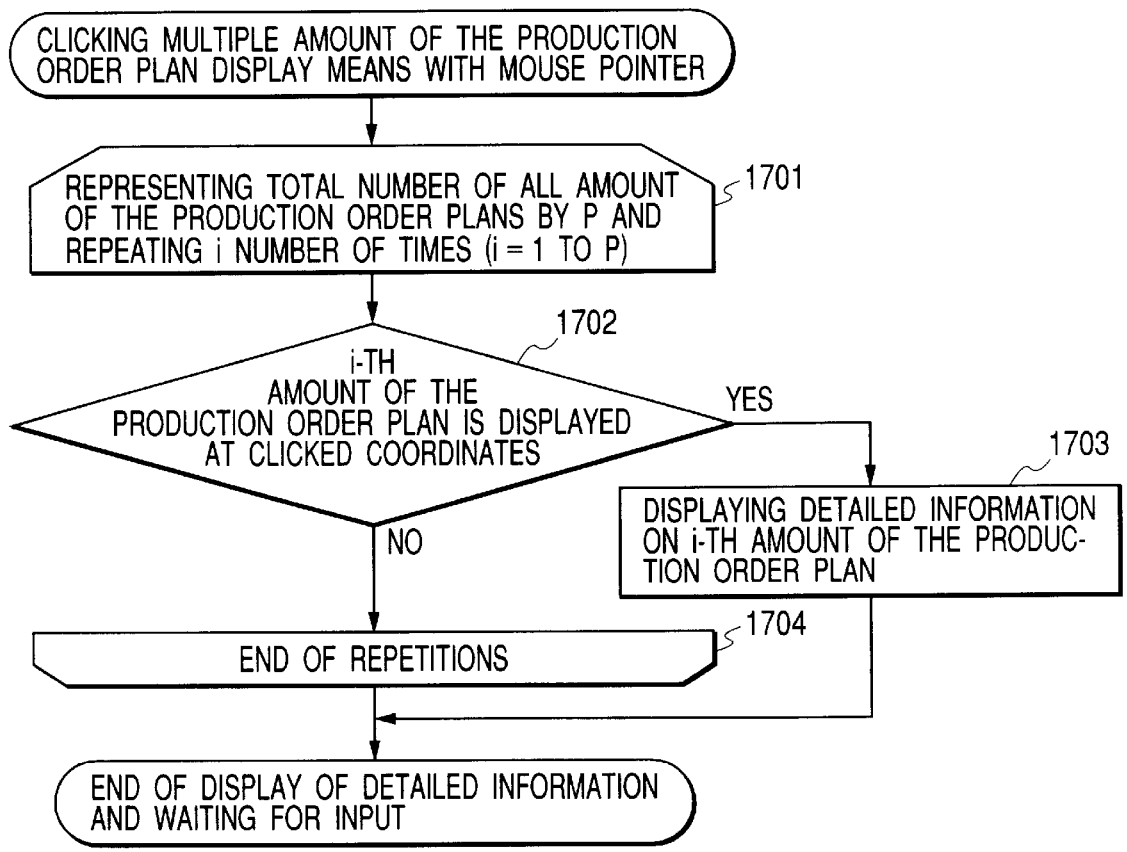
FIG. 17 is a flowchart of processing for the display of detailed information on a set of amount of the production order in one embodiment of the present invention.

A description is subsequently given of the display and selection of the results obtained after optimization which has been outlined with reference to FIG. 8. FIG. 16 shows the processing of selectively displaying a plurality of sets (plans) of amount of the production order. A P number of sets of amount of the production order obtained by optimization computation from the production instruction volume information memory 109 (1601) are read. Then, the processing from step 1602 to step 1608 is repeated for all the sets of amount of the production order.

It is determined whether there is another set of amount of the production order which is superior to an i-th set of amount of the production order in all the evaluation values (1603). When there is, the i-th set of amount of the production order is not displayed (1604). When there is not, the probability of obtaining a minus profit is represented by $x_i$ (1605). Then, a large profit obtained at a probability of a certain value or more is represented by $y_i$ (1606). A circle is displayed at coordinates ($x_i$, $y_i$) (1608). After the above processing is repeated a P number of times, the display processing is over and an input from the user is awaited.

When the user clicks on a set of amount of the production order with the mouse pointer displayed on the display screen, the next processing for displaying detailed information on the specified set of amount of the production order is carried out. The steps from 1701 to 1704 are repeated. It is determined whether all the sets of amount of the production order are displayed at coordinates clicked by the user with the mouse (1702). When they are displayed, detailed information on the sets of amount of the production order as shown in FIG. 8B is displayed (1703). After the detailed information is displayed, an input is awaited.

Figure 18:
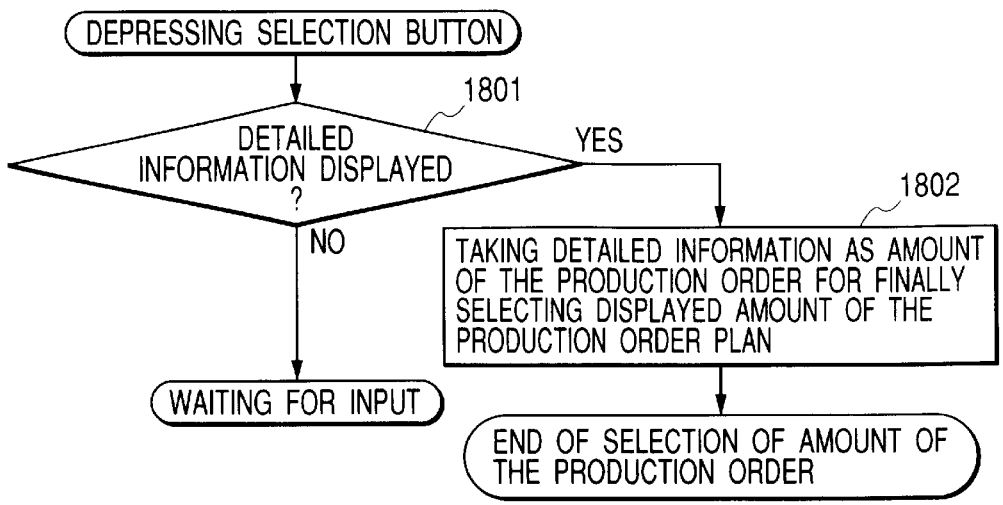
FIG. 18 is a flowchart of processing for the selection of a set of amount of the production order in one embodiment of the present invention.

FIG. 18 shows the processing for finalizing the selection of a set of amount of the production order displayed on the display screen when it is specified. In response to the depression of the selection button by the user, it is determined whether detailed information is displayed (1801). When the detailed information is displayed, the set of amount of the production order whose detailed information is displayed is considered as the finally selected set of amount of the production order (1802), thereby terminating the selection of a set of amount of the production order. When it is not, an input is awaited.

According to the present invention, a plurality of sets of amount of the production order of a plurality of products can be created in consideration of forecast risk and profit based on the estimate of demand. An appropriate set of amount of the production order can be selected from the plurality of sets of amount of the production order based on a management strategy.

What is claimed is:

1. A production instruction volume decision support method comprising the steps of:

creating a plurality of sets of amount of the production order having information for specifying the production volumes of a plurality of products;

simulating demand for each product from demand forecast information for each product;

computing evaluation values of a plurality of evaluation indices from demand for each product and the production volume of each product for each set of amount of the production order;

computing sets of amount of the production order which are inferior to other sets of amount of the production order in some evaluation indices but superior to the other sets of amount of the production order in the other evaluation indices to output a plurality of sets of amount of the production order; and displaying the output plurality of sets of amount of the production order so that a user can select one of them.

2. The production instruction volume decision support method according to claim 1, wherein said demand forecast information for each product is obtained by computing a probability distribution of profit in computation of an evaluation value using a probability distribution of demand forecast.

3. The production instruction volume decision support method of claim 1, wherein the computation of evaluation values of the plurality of evaluation indices is computation of a risk minimization evaluation value as an evaluation index for minimization of risk and a profit maximization evaluation value as an evaluation index for maximization of profit.

4. The production instruction volume decision support method according to claim 2, wherein the computation of evaluation values of said plurality of evaluation indices is computation of probability values of risk and profit from the probability distribution of profit.

5. The production instruction volume decision support method according to claim 3, wherein said computation of the risk minimization evaluation value is computation of a probability of obtaining a minus profit and said computation of the profit maximization evaluation value is computation of a profit value obtained at a probability of a certain value or more.

6. The production instruction volume decision support method according to claim 3, wherein said computation of the profit maximization evaluation value is computation of profit using at least one of sales unit price information, production cost information, inventory cost information and initial inventory information for each product and opportunity loss calculation coefficient information for computing lost sales opportunities due to a shortage of supply despite demand into an amount of money.

7. The production instruction volume decision support method according to claim 1, wherein creation of said plurality of sets of amount of the production order is computation of the sets of amount of the production order of products using production resource capacity information and production resource consumption information on consumption of resources for production of each product so that total consumption of production resources for the production of all the products does not exceed production resource capacity.

8. The production instruction volume decision support method according to claim 1, wherein each of the plurality of sets of amount of the production order is displayed as one mark on a graph showing said evaluation indices, and selection means for selecting one of said plurality of sets of amount of the production order are displayed.

9. A production instruction volume decision support method comprising the steps of:

creating a plurality of sets of amount of the production order;

obtaining a plurality of evaluation values based on simulation of demand for each product;

obtaining a superiority relationship among the sets of amount of the production order from the evaluation values;

creating a new set of amount of the production order from two sets of amount of the production order which are superior to the other sets of amount of the production order;

repeating the above steps a predetermined number of times to obtain solutions to the plurality of sets of amount of the production order which have been optimized;

displaying a plurality of sets of amount of the production order which have nothing superior thereto; and displaying means for enabling a user to select one of them.

10. A production instruction volume decision support program for enabling a computer for support decision on amount of the production order of products to function as:

means for creating a plurality of sets of amount of the production order having information for specifying production volumes of a plurality of products;

means for simulating demand for each product from demand forecast information of each product;

means for computing evaluation values of a plurality of evaluation indices from demand for each product and the production volume of each product for each set of amount of the production order;

means for computing sets of amount of the production order which are inferior to other sets of amount of the production order in some evaluation indices but superior to the other sets of amount of the production order in the other evaluation indices to output a plurality of sets of amount of the production order; and means for displaying the output plurality of sets of amount of the production order so that a user can select one of them.

\* \* \* \* \*